United States Patent [19]
Zelda

[11] Patent Number: 5,194,844
[45] Date of Patent: Mar. 16, 1993

[54] VEHICLE THEFT PROTECTION DEVICE

[76] Inventor: Arthur W. Zelda, P.O. Box 2291, Valley Center, Calif. 92082

[21] Appl. No.: 762,902

[22] Filed: Sep. 19, 1991

Related U.S. Application Data

[63] Continuation-in-part of Ser. No. 254,546, Oct. 6, 1988, abandoned.

[51] Int. Cl.$^5$ .......................................... B60T 7/16
[52] U.S. Cl. ........................... 340/426; 280/33.994; 180/167
[58] Field of Search ............... 340/426, 551, 561, 571, 340/686, 323 R, 815.11; 188/1.12, 19, 111, 162; 280/33.994; 180/167

[56] References Cited

U.S. PATENT DOCUMENTS

| | | | |
|---|---|---|---|
| 3,031,037 | 4/1962 | Stollman | 280/33.994 X |
| 3,157,871 | 11/1964 | Umanoff | 280/33.994 X |
| 3,495,688 | 2/1970 | Isaacks | 280/33.994 X |
| 3,652,103 | 3/1972 | Higgs | 280/33.994 |
| 4,242,668 | 12/1980 | Herzog | 340/539 |
| 4,424,511 | 1/1984 | Alberts, Jr. | 340/815.11 X |
| 4,577,880 | 3/1986 | Bianco | 188/1.12 X |
| 4,591,175 | 5/1988 | Upton et al. | 280/33.994 |
| 4,609,075 | 9/1986 | Snedeker | 280/33.994 X |
| 4,683,461 | 7/1987 | Torre | 340/551 |
| 4,772,880 | 9/1988 | Goldstein et al. | 340/571 |
| 4,809,824 | 3/1989 | Fargier et al. | 188/162 X |

Primary Examiner—Jin F. Ng
Assistant Examiner—Brian R. Tumm
Attorney, Agent, or Firm—Stetina and Brunda

[57] ABSTRACT

A theft prevention system for vehicles such as shopping carts that are intended to be used within a prescribed area include a current conductor that is embedded proximate a perimeter of the prescibed area, this conductor being driven by an asymmetrical periodic waveform for producing a magnetic field. Each vehicle is equipped with a receiver circuit for operating a wheel mechanism. The mechanism is operable between a locked position and an unlocked position by a motor. The mechanism is automatically restored to an unlocked condition by movement of the vehicle returning it to within the prescribed area. A buzzer also provides a warning sound when the vehicle is taken from the prescribed area, the system further including an array of microphones that are connected into a circuit that provides an alarm when a vehicle is about to be removed from the prescribed area, an alarm signal component further indicating the approximate location of the offending vehicle.

19 Claims, 4 Drawing Sheets

VEHICLE THEFT PROTECTION DEVICE

RELATED INVENTIONS

This subject application is a continuation-in-part of co-pending patent application Ser. No. 07/254,546 filed on Oct. 6, 1988, now abandoned, entitled VEHICLE THEFT PROTECTION DEVICE.

FIELD OF THE INVENTION

The present invention relates generally to a vehicle theft prevention device, and more particularly to a system for preventing theft of vehicles such as shopping carts and the like that are operated by business customers within a prescribed area.

BACKGROUND OF THE INVENTION

Business owners and managers are confronted with the serious problem of shopping cart thefts as well as the removal of shopping carts from the business premises. Shopping carts are normally made available for customers for use within a business structure as well as at least a portion of an adjoining parking lot. Problems arise when the shopping carts are taken off the business premises, for reasons of theft or for some otherwise innocent purpose. Carts are often stolen for the resale value or personal use, whereas other times a cart may be removed from the premises due to a customer's legitimate desire to transport goods to a nearby residence or distantly parked automobile. All to often, however, regardless of the purpose for removal, once a cart is removed from the premises, it is never returned.

Businesses are justifiably concerned with the removal of shopping carts from their business premises since an average shopping cart will cost the business operator approximately $110.00. Due to the relative expense of the shopping carts, as well as the frequency of shopping cart thefts and removal from the premises, a demand has been created for businesses which specialize in shopping cart recovery. Once such company is known as Oliver's Cart Recovery Service located in the Southern California region of the United States. Oliver's Cart Recovery Service operates fifty (50) recovery trucks in and around Southern California, as well as the Las Vegas area. The company claims that each day it recovers approximately 11,000 carts. Due to the staggering number of cart thefts and removal, there is a great need by business owners for preventing shopping carts and the like from ever leaving the business premises.

Previous methods have been devised in an attempt to retain shopping carts on the premises. Such methods include the providing of physical barriers along the perimeter of a prescribed area, however, such barriers are impractical since it is desirable to allow a customer access to an automobile for the loading of goods.

Other vehicle theft prevention systems include those which provide a device for producing alarm signals on board each vehicle wherein such device is activated by a short range radio transmitter located on the premises in the event of removal of the cart from the premises. It is also known to provide means for immobilizing the cart in response to a radio transmission as disclosed in U.S. Pat. No. 4,242,668 issued to Herzog. Also, U.S. Pat. No. 4,577,880 issued to Bianco, discloses a solenoid-operated brake device for a shopping cart wheel which is activated in response to an array of permanent magnets imbedded in an entrance area of an enclosed parking lot area.

Previously and presently known vehicle theft prevention systems are normally ineffective as illustrated by the numerous thefts that occur each day, and such systems thereby fail to prevent the theft or removal of arts from a prescribed area. Such known systems are difficult to monitor in that they do not provide a means for detecting an impending theft attempt. Also., known systems are difficult to maintain, requiring special equipment to restore a cart to an operational condition once a theft attempt has been made. Additionally, most systems are cost prohibitive to produce since such systems include expensive hardware which must be incorporated on board each cart, as well as the necessary equipment that is installed upon the premises to operate the system.

Thus there exists a substantial need in the art for an effective vehicle theft prevention system that provides easy monitoring and that is inexpensive to both produce and maintain.

SUMMARY OF THE INVENTION

The present invention meets the aforementioned need in the art by providing a theft prevention system for vehicles intended to be moved about within a prescribed area but not removed therefrom. The vehicle of the present invention is capable of movement across at least a portion of a perimeter of the prescribed area. The system of the present invention includes means for producing a magnetic field polarized in a direction locally parallel to at least a portion of the perimeter and having a asymmetrical time-variant waveform. Additionally, the vehicle includes means for detecting a received magnetic field, including sensor means, amplifier means responsive to the sensor means for producing a signal proportional to the magnetic field, and signal generator means for producing a control signal from the variable signal at levels above and below a control threshold level in response to the movement of the vehicle from within to outside the prescribed area. The present invention also including means for inhibiting movement of the vehicle when the control signal is at a level corresponding to location of the vehicle outside the prescribed area.

Preferably the means for producing the magnetic field includes an electrical conductor extending proximate the perimeter of the prescribed area. An oscillator means is provided having means for producing an asymmetrical signal, and means for driving current in the conductor in response to the oscillator signal. The oscillator means can include an astable multivibrator having a duty cycle of less than 40%. Preferably the duty cycle is less than 30%; more preferably, the duty cycle is between about 15% and about 25%.

Preferably the means for driving current in the conductor produces unidirectional current for effective use of a single-ended current driver for low-cost fabrication of the system. The oscillator can have a frequency of about 1 kHz to about 100 kHz, preferably about 10 kHz.

The vehicle can be movably supported on a surface that includes the prescribed area, the conductor preferably being embedded in the surface along substantially the entire portion of the perimeter that the vehicle is capable of crossing. The sensor means can include an inductive coil having an axis oriented perpendicular to the surface. Preferably the amplifier includes an AC-coupled amplifier circuit, and the signal detector means includes a pair of peak detectors having opposite polarity for producing in each detector an output voltage proportional to a maximum voltage of the amplifier means relative to an average amplifier voltage, and means for producing the control signal as an average of the detector output voltages.

Thus when the vehicle is within the prescribed area, the control signal is at a first level; when the vehicle is moved outside of the prescribed area, the control signal assumes a second level, the first and second levels being on opposite sides of the control threshold level; and when the vehicle is returned to within the prescribed area, the control signal returns to the first level.

In an important aspect of the present invention, the system includes means generally for providing the control signal on the vehicle in response to movement of the vehicle from within to without the prescribed area, and brake means operatively connected to supporting wheel of the vehicle for inhibiting movement of the vehicle when the control signal is at the second level. The brake means includes a wheel lock mechanism having an engaged position for preventing rotation of a supporting wheel of the vehicle. The mechanism also has a disengaged position, wherein a motor is geared to the mechanism and powered in response to the control signal. The motor is momentarily powered for driving the mechanism to the engaged position when the control signal moves from the first level to the second level. More preferably, when the control signal moves from the second level to the first level, the motor is again momentarily powered from driving the mechanism to the disengaged position.

The means for inhibiting movement of the vehicle can also include sound means on the vehicle for signalling occurrence of the second level of the control signal. The system can further include monitor means for producing an alarm signal and having microphone means proximate the prescribed area for producing a microphone signal and response to the sound means, bandpass filter means responsive to the microphone signals for producing the alarm signal upon occurrence of the second level of the control signal. Preferably the microphone means includes a plurality of microphones, a microphone being located proximate each portion of the perimeter over which the vehicle can be moved, the monitor means providing separate alarm signal components for locating the portion of the perimeter over which the vehicle was moved.

Thus the present invention provides a versatile, low-cost theft prevention system for vehicles such as shopping carts, the system being easy to maintain in that the brake mechanism, once engaged, is easily disengaged by merely moving the vehicle to within the prescribed area. The system is particularly advantageous where large portions of the perimeter of the prescribed area are capable of being traversed by vehicles such as automobiles for convenience of customers. This is because the cost of the system is not dependent on the percentage of the perimeter over which vehicles may pass.

DETAILED DESCRIPTION OF THE PREFERRED EMBODIMENT

The detailed description set forth below in connection with the appended drawings is intended merely as a description of the presently preferred embodiments of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

Figure 1:
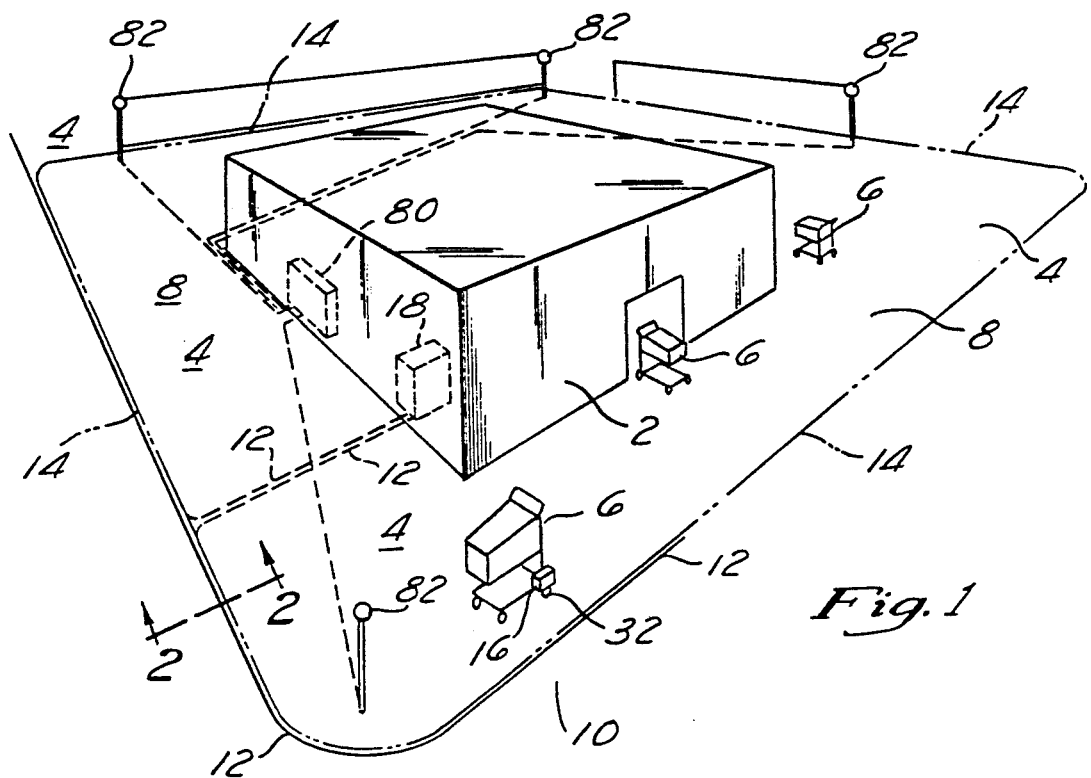
FIG. 1 is an oblique perspective plan view of a commercial building structure including an associated parking area, including the vehicle theft prevention system of the present invention.

The present invention is directed to a theft prevention system for vehicles such as shopping carts that are intended to be used within a prescribed area, the vehicles being otherwise capable of movement outside of the prescribed area. With reference to the drawings, most particularly FIG. 1, a commercial building structure 2 has an associated automobile parking area 4 and a plurality of shopping carts or vehicles 6 that are intended to be used within a prescribed area 8. According to the present invention, a theft prevention system 10 includes a conductor 12 that extends proximate a perimeter 14 of the prescribed area 8, at least along those portions of the perimeter 14 that are traversable by the vehicles 6. The system 10 further includes for each of the vehicles 6 a vehicle unit 16 that is operative for inhibiting movement of the associated vehicle 6 in response to movement of the vehicle 6 from within the prescribed area 8 across the perimeter 14.

Figure 3:
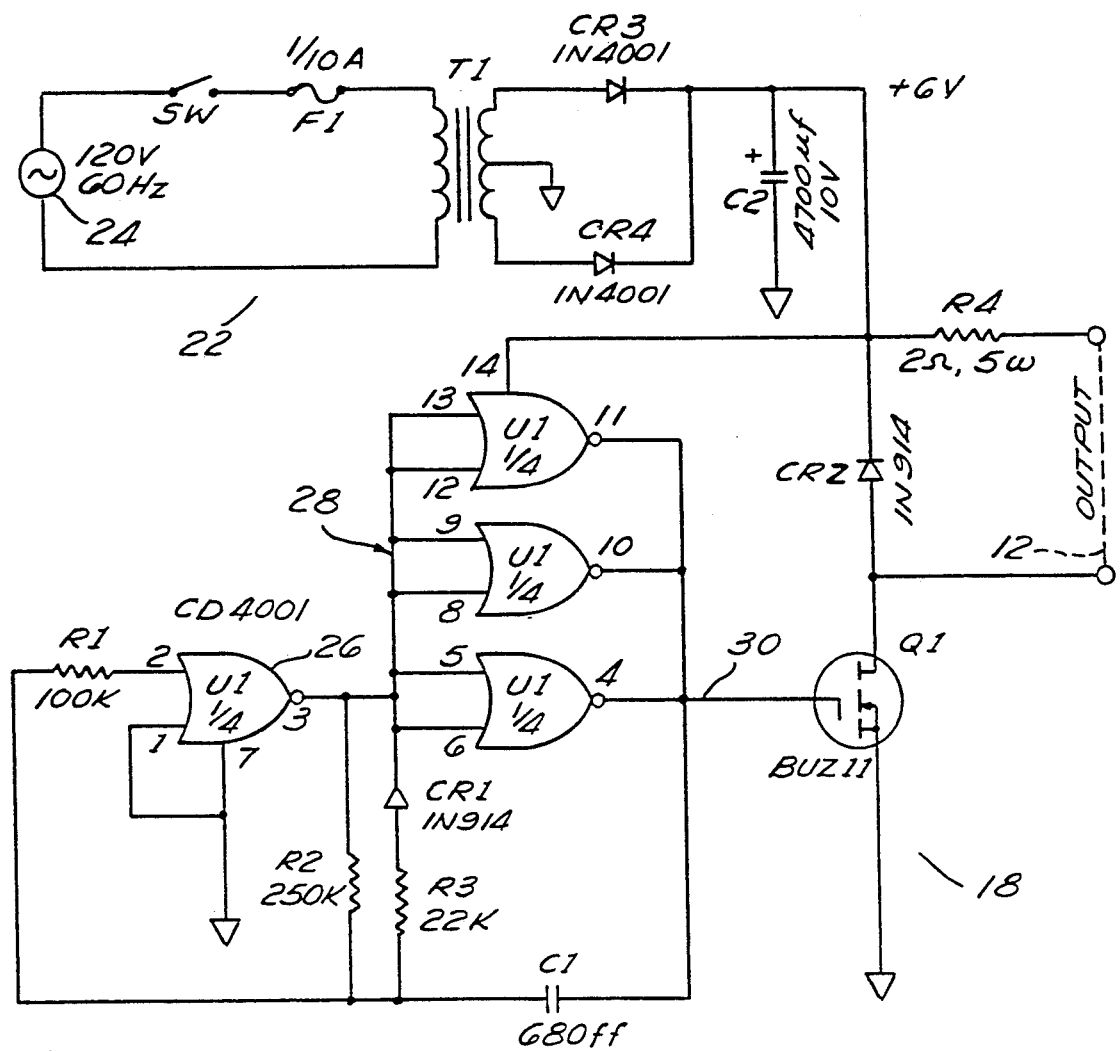
FIG. 3 is a schematic diagram of a transmitter circuit for producing a magnetic field.
Figure 2:
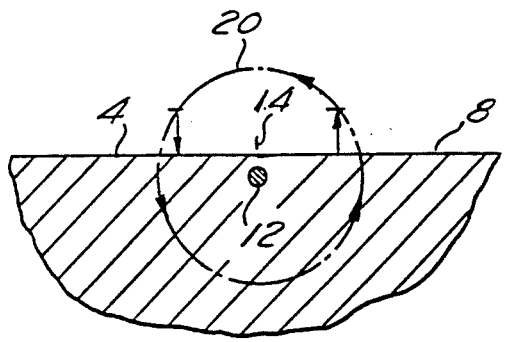
FIG. 2 shows a cross-sectional view of a buried conductor which comprises the perimeter of the operating area.

With further reference to FIGS. 2 and 3, a transmitter circuit 18 is operatively connected to the conductor 12 for producing a time-variant polarized magnetic field 20 proximate the perimeter 14 of the prescribed area 8. The transmitter circuit 18 includes a conventional low voltage power supply 22 that is driven from ordinary 120 volt, 60 Hz line power 24, the power supply 22 providing approximately 6 volts DC. The power supply 22 drives a conventional integrated circuit CMOS quad NAND module 26 that is connected for forming a pulse generator 28. The pulse generator 28 includes associated resistors R1, R2, and R3, capacitor C1, and diode CR1 that are selected in a conventional manner for producing approximately 6 volts at a generator output 30 for a duration of about 20 microseconds, the generator output 30 returning to a ground level for about 80 microseconds, repetitively. The generator output 30 is connected to the gate of a power FET Q1, the FET Q1 being driven into its conducting state during the time the pulse generator 28 is positive, allowing current to flow from the power supply 22 through a resistor R4, thence through the conductor 12 in the form of a wire loop around the perimeter 14 of the prescribed area 8, from which the current then flows through the FET Q1 to ground. A diode CR2 clamps a voltage spike that would otherwise be produced by inductance of the wire loop formed by the conductor 12 when the current is terminated by a current of the low level at the generator output 30. The transmitter circuit 18 of the present invention is particularly advantageous in that the conductor 12 is driven with unidirectional current, thus permitting a very simple circuit, and very low power consumption is facilitated in that current flows in the conductor 12 only approximately 20% of the time.

Figure 4:
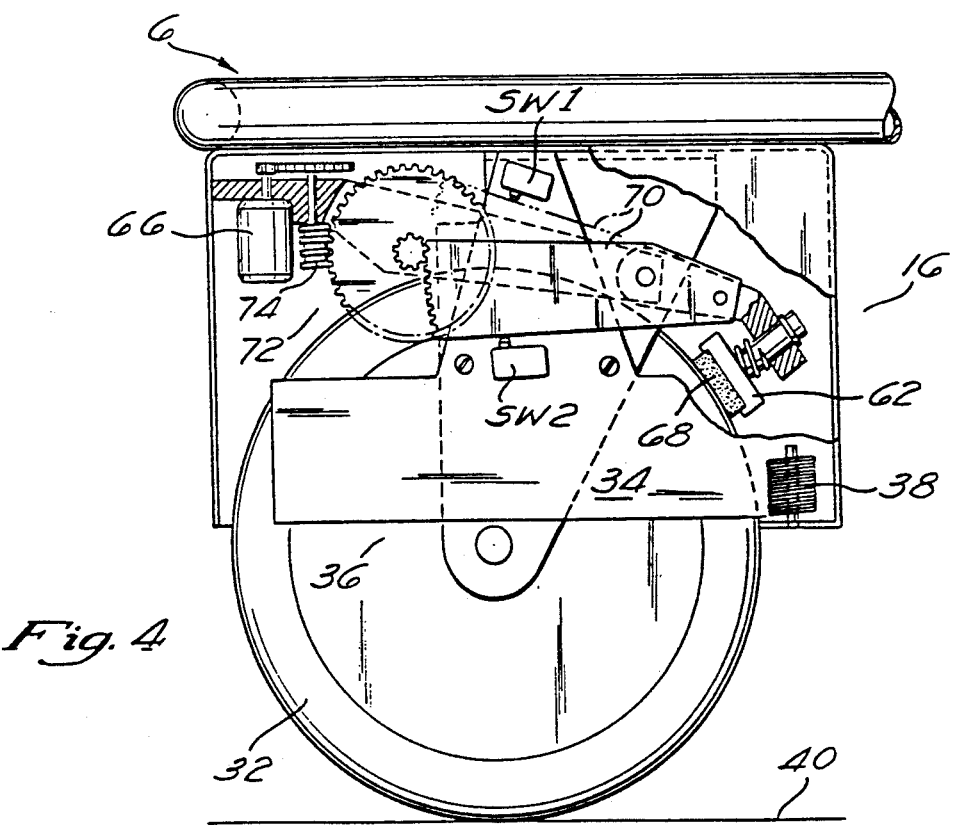
FIG. 4 is a cross-sectional fragmentary view of a vehicle immobilizing/braking device.
Figure 5:
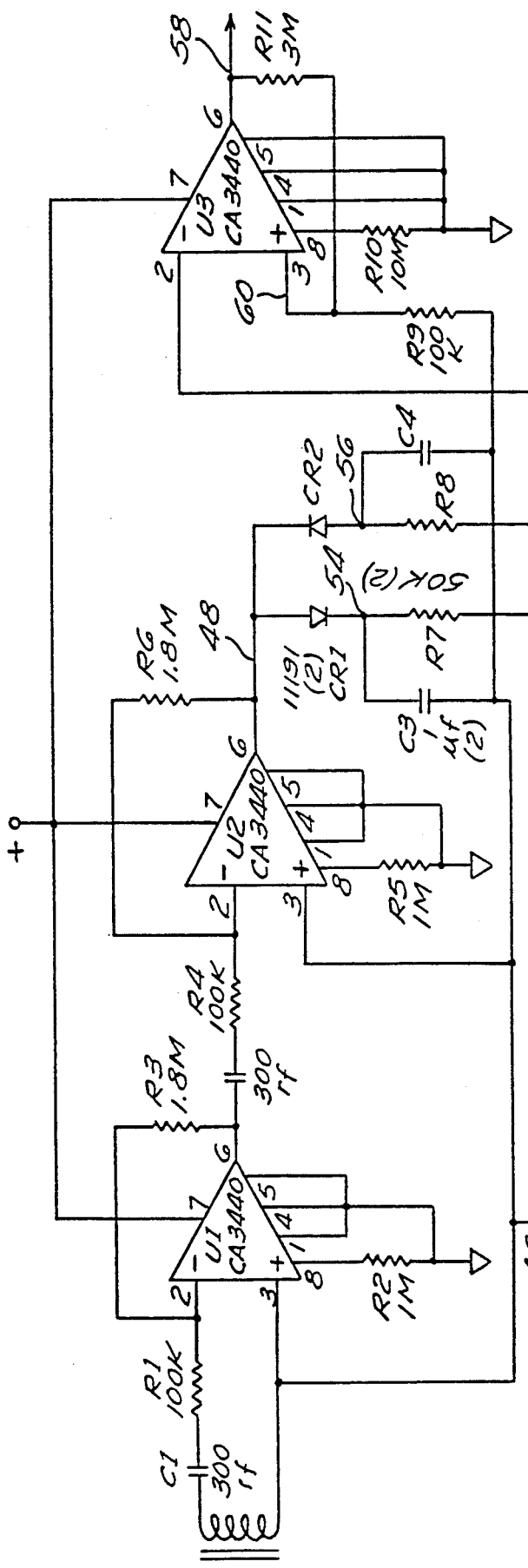
FIG. 5 is a schematic diagram of a control circuit of the braking unit as shown in FIG. 4.
Figure 6:
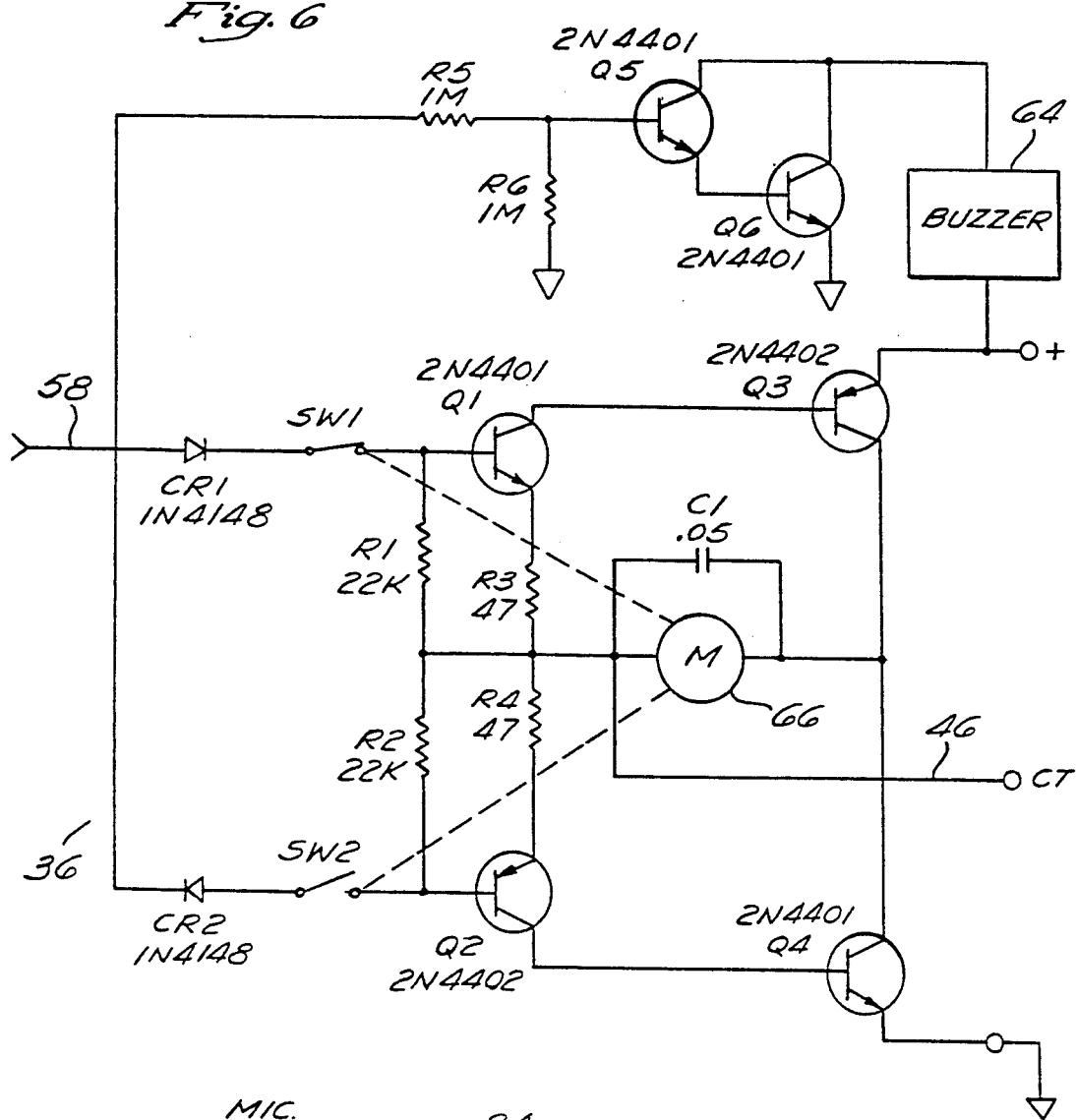
FIG. 6 is a schematic diagram of an inhibitor circuit of the braking unit of FIG. 4.

With further reference to FIGS. 4-6, each vehicle unit 16 is mounted proximate a supporting wheel 32 of the vehicle 6, each vehicle unit 16 including a receiver circuit 34 that is responsive to the field 20, and inhibitor means 36 that is responsive to the receiver circuit 34 for inhibiting movement of the vehicle 6 outside of the prescribed area 8. The receiver circuit 34 includes an inductive coil 38 that is oriented axially perpendicular to a supporting surface 40 for the wheel 32, the coil 38 being made of many turns of fine wire wound on an iron core. The receiver circuit 34 includes four AA batteries that are connected in series, with a center point tap 46 for producing positive and negative 3 volts of electrical power about the tap 46. When the coil 38 is passed over the embedded conductor 12 that is being energized by the transmitter circuit 18, the magnetic field 20 is coupled into the coil 38 and amplified by a micropower operational amplifier U1 of FIG. 5 wherein U1 is capacitively coupled to the coil 38 by a series-connector capacitor C1 and resistor R1. The output of the amplifier U1 is capacitively coupled through a series-connected capacitor C2 and resistor R4 to a second operational amplifier U2 for further amplification.

Figure 7B:
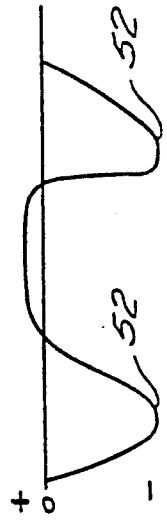
FIG. 7b is a waveform diagram of an amplifier output of the circuit of FIG. 5 when the vehicle is located outside the prescribed area.
Figure 7A:
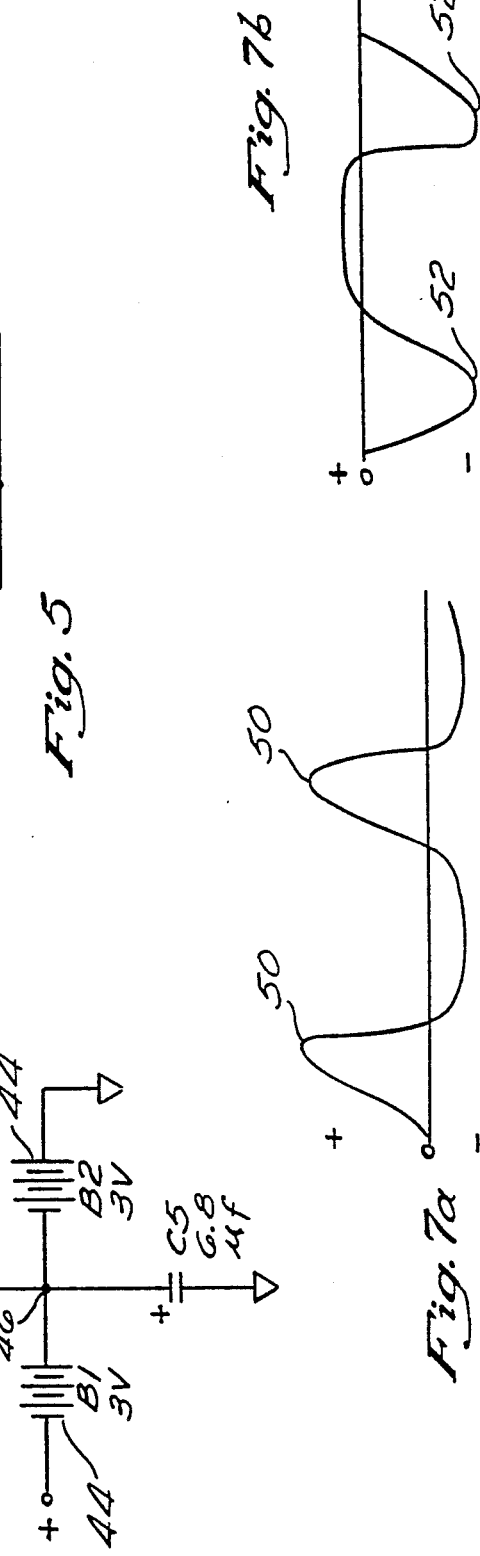
FIG. 7a is a waveform diagram of an amplifier output of the circuit of FIG. 5 when the vehicle is located within a prescribed area.

With further reference to FIGS. 7a and 7b, an amplifier output 48 of the amplifier U2 has an asymmetrically periodic waveform. That the waveform of the amplifier output 48 is asymmetrical is due to the unsymmetrical duty cycle of the current in the conductor 12, the current being present only 20% of the time. Because the operational amplifiers U1 and U2 are AC coupled, the waveform of the amplifier output 48 has equal area above and below a reference level which is the voltage at the center tap 46 as shown in FIGS. 7a, the amplifier output 48 exhibits positive peaks 50 when the vehicle 6 is within the prescribed area 8. However, when the vehicle 6 is outside of the prescribed area 8, the amplifier 48 exhibits negative peaks 52 as shown in FIG. 7b.

The positive peaks 50 and the negative peaks 52 from the amplifier output 48 are separately rectified and filtered by diodes CR1 and CR2, and capacitors C3 and C4. This produces a positive voltage equal to the most positive level of the amplifier 48 at a positive node 54. Similarly, a negative voltage equal to the maximum negative voltage of the amplifier output 48 is produced at a negative node 56. The signals at the positive note 54 and the negative node 56 are averaged by a pair of series-connected resistors R7 and R8 and further amplified by another micropower operational amplifier U3. Because the voltages at the positive node 54 and the negative 56 are of opposite polarity and unequal voltage, the average voltage produced by the resistors R7 and R8 is always positive, negative or zero, depending on the position of the coil 38 relative to the conductor 12. The amplifier U3 is connected as a latching level detector by the use of a positive-feedback network that includes a series-connected pair of resistors R11 and R9, the resistor R11 being connected between a control signal output 58 of the amplifier U3 and a reference input 60 of the amplifier U3.

In the operation of the receiver circuit 34, if the coil 38 is at a great distance from the conductor 12 either inside or outside the perimeter, the output of the amplifier U2 will be substantially zero with respect to the center tap 46, such that the resistors R7 and R8 also produce an averaged voltage of zero which is fed to pin 2 of the amplifier U3. The amplifier U3 compares the voltage at its pin 2 with the reference input 60 at its pin 3, the reference input 60 being offset from zero by the output condition of the amplifier U3 at the control signal output 58, which is fed back to the reference input 60 by the resistor R11. This voltage offset is determined by the ratio of the resistors R9 and R11, which in the case of the circuit shown in FIG. 5, is approximately ±0.1 volt. It can be seen that if the initial state of the amplifier U3 was that the control signal output 58 was positive which occurs only when the vehicle was originally outside the perimeter, the shift at the reference input 60 would be plus 0.1 volt, and with the inverting input at pin 2 of the amplifier U3 at zero, the control signal output 58 would be held at the positive level thus inhibiting free movement of the vehicle. If the coil 38 is moved across the conductor 12 from outside the perimeter, such as to produce a net positive voltage from the resistors R7 and R8 greater than 0.1 volt, the control signal output 58 originally positive would go negative and the reference input 60 would be shifted to minus 0.1 volt thus allowing free movement of the vehicle. This would latch the amplifier U3 into this new state and it would remain so until the coil 38 was moved to the opposite side of the conductor 12, thereby reversing the phase and the voltage from the summing resistors R7 and R8. This is due to an oppositely oriented vertical component of the polarized magnetic field 20 that occurs on opposite sides of the conductor 12, as shown in FIG. 2.

The following specific examples of the various possible movements of the vehicle inside and outside of the perimeter are included for purposes of illustration to aid in understanding the present invention:

1. The vehicle is a great distance from the conductor 12 and disposed outside the perimeter. Since the initial state of the amplifier U3 was that the control signal output 58 was previously positive, which occurs when the vehicle is disposed outside the perimeter, the shift at the reference feedback input 60 would be plus 0.1 volt and with the inverting input at pin 2 of the amplifier U3 at zero, the present control signal output 58 would be held at the positive level, thus inhibiting free movement of the vehicle. Pin 3 positive, pin 2 zero, 58 remains positive.

2. The vehicle is outside the perimeter and has moved into the proximity of the conductor 12: In this case, since the control signal output 58 was previously positive, the shifts at the reference 60 would be plus 0.1 volt and with the inverting pin 2 at of the amplifier producing a negative voltage from resistors R7 and R8 greater than 0.1 volt, the control signal output 58 would remain positive. Pin 3 positive, pin 2 negative, 58 remains positive.

3. The vehicle has moved across the conductor 12 from outside the perimeter. This movement produces a net positive voltage from resistors R7 and R8 greater than 0.1 volt. Thus, since the control signal output 58 was previously positive the shift at the reference 60 would be plus 0.1 volt and thereby shifting signal output 58 to negative allowing free movement of the vehicle. Pin 3 positive, pin 2 positive, 58 shifts negative.

4. The vehicle is a great distance from the conductor 12, but which is inside the perimeter. Since the initial state of the amplifier U3 is that the control signal output 58 was previously negative, which occurs only when the vehicle is disposed inside the perimeter, the shift at the reference input 60 would be minus 0.1 volt, and with the inverting input at pin 2 of amplifier U3 at substantially zero, the control signal output 58 would be held at the negative level, thus allowing free movement of the vehicle. Pin 3 negative, pin 2 at zero, 58 remains negative.

5. The vehicle is moved from inside the perimeter into the proximity of the conductor 12. This movement produces a net positive voltage from resistors R7 and R8 greater than 0.1 volt. Thus, since signal output 58 was previously negative the shift at the reference 60 would be minus 0.1 volt and the control signal output 58 would remain negative. Pin 3 negative, pin 2 positive, 58 remains negative.

6. The vehicle is moved across the conductor 12 from inside the perimeter to outside the perimeter. This movement of the vehicle across the conductor 12 from inside the perimeter to outside the perimeter produces a net negative voltage from resistors R7 and R8 greater than 0.1 volt. Thus, since the control signal output 58 was previously negative the shift at the reference 60 would be minus 0.1 volt and thereby shifting signal output 58 to positive prohibiting free movement of the vehicle. Pin 3 negative, pin 2 negative, 58 shifts positive.

With particular reference to FIGS. 4 and 6, the inhibitor means 36 is operatively connected to the control signal output 58 for driving a brake mechanism 62 and an audio buzzer 64. When the control signal output 58 is positive, a transistor Q5 is biased on for causing another Q6 to conduct, thereby producing current from the positive 3 volts to flow through the buzzer 64, thus alerting those nearby to a possible impending attempt to remove the vehicle 6 from the prescribed area 8. In response to the sound of the buzzer 64, a user that was inadvertently moving the vehicle 6 from the prescribed area 8 may be motivated to return the vehicle 6 to within the prescribed area 8, especially if the user is aware of others nearby who might perceive that the vehicle 6 was being stolen. Thus movement of the vehicle 6 from the prescribed area 8 is inhibited by the system 10.

The brake mechanism 62 provides a more direct means for inhibiting further movement of the vehicle 6, by locking the supporting wheel 32 as described herein. When the control signal output 58 is positive, a cascaded pair of transistors Q1 and Q3 is caused to conduct current from the positive 3 volt supply through a motor 66 to the center tap 46, in response to a base current that flows through normally closed contacts of switch SW1 and a series-connected diode CR1. Thus activated, the motor 66 drives a brake member 68 into contact with the wheel 32, the brake member 68 being biasingly mounted to a sector arm 70 that is driven by the motor 66 through a gear train 72, the sector arm 70 moving from an unlocked position shown by solid lines in FIG. 4 to an unlocked position, shown by dashed lines, the sector arm 70 producing an open condition of the switch SW1 in the locked position. Once the contacts of the switch SW1 are open, the motor 66 is disabled from its connection to the positive 3 volts, coming to rest. As shown in FIG. 4, the gear train 72 includes a worm gear 74, the worm gear 74 serving to lock the gear train 72 from further movement once the motor 66 comes to rest. Accordingly, the brake mechanism 62, once activated to its locked condition, consumes essentially no current, even when the control signal output 58 continues indefinitely at its high level.

Similarly, when the control signal output 58 moves to its low level, the motor 66 is driven direction by a cascaded pair of transistors Q2 and Q4 in the presence of a base signal that is series-coupled to the control signal output 58 through normally closed contacts of switch SW2 and a diode CR2. Thus the sector arm 70 is returned to its unlocked position at which point the contacts of the switch SW2 are caused to open by the sector arm 70 is returned to its unlocked position at which point the contacts of the switch SW2 are caused to open by the sector arm 70, the motor 66 again coming to rest with essentially no further current being required by the brake mechanism 62 until such time as the control signal output 58 again returns to its positive level. At the same time, the transistors Q5 and Q6 are returned to a non-conducting state, thereby deactivating the buzzer 64.

It is to be understood that the need for the worm gear 74 can be avoided by the use of an over-center mechanism (not shown) for coupling the gear train 72 to the brake member 68.

Figure 8:
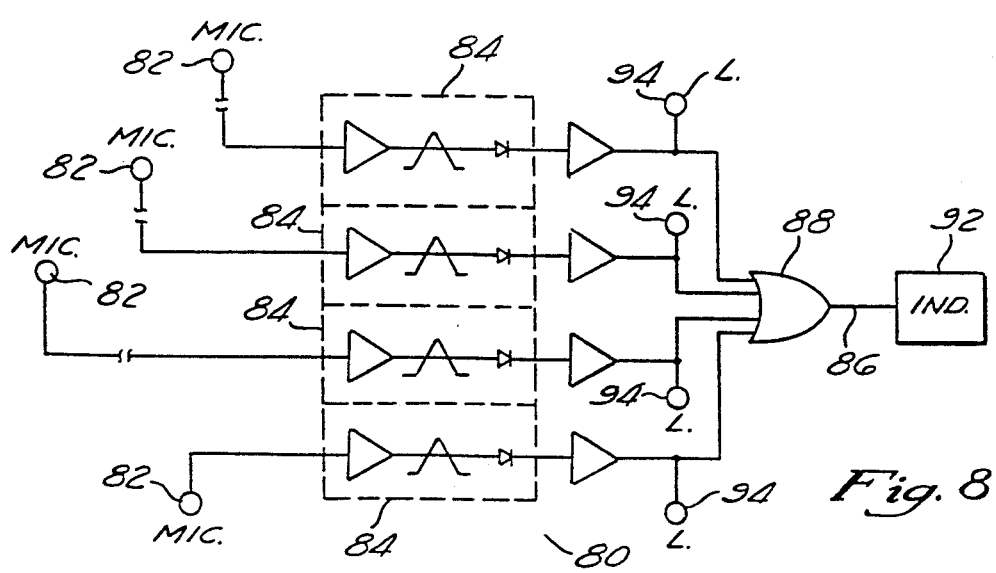
FIG. 8 is a circuit diagram of an alarm monitor circuit of the system of FIG. 1.

With further reference to FIG. 8, the present invention provides for convenient monitoring of the system 10. As shown in FIG. 8, a monitor 80 includes a plurality of microphones 82, the microphones 82 being located proximate the perimeter 14 of the prescribed area 8 at points selected for receiving a sound input from the buzzer 64 of any of the vehicles 6 that might be moved out of the prescribed area 8. Each microphone 82 is connected through a band-pass filter 84 for producing an alarm signal 86, the alarm signal 86 being produced as the output of an OR gate 88 that is responsive to a signal component 90 that is produced by a corresponding one of the band-pass 84, each band-pass filter 84 being responsive to a narrow band of frequencies that are associated with the buzzer 64. The alarm signal 86 is connected for driving an alarm indicator 92; also, each of the signal components 90 is connected for driving a respective lamp 94. Thus, when a vehicle 6 that is equipped with a vehicle unit 16 of the system 10 is moved out of the prescribed area 8, the indicator 92 shows an alarm condition of the alarm signal 86. Also, the approximate location of the offending vehicle 6 is identifiable by means of activation of the lamp 94 that is associated with the receiving microphone 82.

Although the present invention has bene described in considerable detail with reference to certain preferred versions thereof, other versions are possible. Therefore, the spirit and scope of the present invention should not necessarily be limited to the description of the preferred versions contained herein.

What is claimed is:

1. A system for preventing theft of a vehicle intended to be moved about freely within a prescribed area but not to be removed from the prescribed area, comprising:

(a) means for producing a magnetic field along perimeter of the prescribed area, wherein said vehicle is capable of movement throughout the prescribed area, the field being polarized in a direction locally parallel to the perimeter and having an asymmetric time-variant waveform;

(b) means on the vehicle for detecting a received magnetic field, comprising:
  (i) sensor means;
  (ii) amplifier means interconnected to the sensor means for producing a time-variant signal proportional to the received magnetic field; and
  (iii) signal generator means for receiving the time variant signal and for producing a control signal in response to the time-variant signal, the control signal having a first level when the vehicle is located within the prescribed area, and a second level when the vehicle is located outside the prescribed area, the first level and the second level being on opposite sides of a control threshold level; and (c) means for inhibiting movement of the vehicle when the control signal is at the second level.

2. The apparatus of claim 1 wherein the means for producing the magnetic field comprises:
  (a) an electrical conductor extending proximate the perimeter of the prescribed area;
  (b) oscillator means comprising means for producing an asymmetrical periodic oscillator signal; and
  (c) means responsive to the oscillator signal for producing a current in the conductor.

3. The apparatus of claim 2 wherein the oscillator means comprises an astable multivibrator having a duty cycle of less than 40%.

4. The apparatus of claim 3 wherein the duty cycle is less than 30%.

5. The apparatus of claim 3 wherein the duty cycle is from 15% to 25%.

6. The apparatus of claim 3 wherein the current flow in the conductor is unidirectional.

7. The apparatus of claim 2 wherein the oscillator means operates at a frequency from 1 kHz to 100 kHz.

8. The apparatus of claim 7 wherein the frequency is substantially 10 kHz.

9. The apparatus of claim 2 wherein the vehicle is movably supported on a surface that comprises the prescribed area, wherein the conductor is imbedded in said surface substantially along the entire perimeter of the prescribed area.

10. The apparatus of claim 1 wherein the sensor means comprises an inductive coil having an axis oriented proximately perpendicular to a surface of the prescribed area and wherein said sensor is located on board said vehicle.

11. The apparatus of claim 10 wherein the amplifier means comprises an electronic circuit amplifier having AC coupling and the signal generator means comprises:
  (a) a pair of peak detectors having opposite polarity, each peak detector producing a detector output voltage proportional to a maximum voltage of the amplifier means relative to an average amplifier voltage; and
  (b) means for producing the control signal as an average of the detector output voltages.

12. The apparatus of claim 1 wherein the means for inhibiting movement of the vehicle comprises brake means for stopping the vehicle.

13. The apparatus of claim 12 wherein the vehicle comprises a supporting wheel and wherein the brake means comprises:
  (a) a wheel lock mechanism having an engaged position preventing rotation of the wheel in a disengaged position;
  (b) a motor geared to the wheel lock mechanism and powered in response to the control signal, whereby, when the control signal moves from the first level to the second level, the motor is momentarily powered for driving the wheel lock mechanism to the engaged position, the wheel lock mechanism then remaining in the engaged position with the motor unpowered.

14. The apparatus of claim 13 wherein, when the control signal moves from the second level to the first level, the motor is momentarily powered for driving the wheel lock mechanism to the disengaged position, the wheel lock mechanism then remaining in the disengaged position with the motor unpowered.

15. The apparatus of claim 12 wherein the means for inhibiting movement of the vehicle comprises sound signal means on the vehicle for audibly indicating occurrence of the second level of the control signal.

16. The apparatus of claim 15 further comprising monitor means for producing an alarm signal, comprising:
  (a) microphone means proximate the prescribed area for producing a microphone signal in response to the sound signal means; and
  (b) band-pass filter means responsive to the microphone signal for producing the alarm signal upon occurrence of the second level of the control signal.

17. The apparatus of claim 16 wherein the microphone means comprises a plurality of microphones, at least one microphone being located proximate each portion of the perimeter over which the vehicle is capable of being moved, the monitor means providing separate alarm signal components for locating the portion of the perimeter over which the vehicle was moved.

18. The apparatus of claim 17 wherein the vehicle is a shopping cart.

19. A system for preventing theft of a vehicle intended to be moved freely within a prescribed area but not to be removed from the prescribed area, comprising:
  (a) means for producing a magnetic field along the perimeter of the prescribed area wherein said vehicle is capable of movement throughout the prescribed area, the field being polarized in a direction locally parallel to the perimeter and having an asymmetric time-variant waveform, comprising:
    (i) an electrical conductor extending proximate the perimeter of the prescribed area;
    (ii) oscillator means comprising means for producing an asymmetrical periodic oscillator signal; and
    (iii) means responsive to the oscillator signal for producing a current in the conductor;
  (b) means on the vehicle for detecting a received magnetic field, comprising:
    (i) sensor means comprising an inductive coil having an axis oriented proximately perpendicular to a surface of the prescribed area and wherein said sensor is located on board said vehicle;
    (ii) amplifier means interconnected to the sensor means for producing a time-variant signal proportional to the received magnetic field, the amplifier means comprising an electronic circuit amplifier having AC coupling; and (iii) signal generator means for receiving the time variant signal and for producing a control signal in response to the time-variant signal, the control signal having a first level when the vehicle is located within the prescribed area, and a second level when the vehicle is located outside the prescribed area, the first level and the second level being on opposite sides of a controlled threshold level, comprising a pair of peak detectors having opposite polarity, each peak detector producing a detector output voltage proportional to a maximum voltage of the amplifier means relative to an average amplifier voltage, and means for producing the control signal as an average of the detector output voltages; and (c) means for inhibiting movement of the vehicle when the control signal is at the second level, comprising brake means for stopping the vehicle.

* * * * *